(12) United States Patent
Schumacher (10) Patent No.: US 11,254,511 B2
(45) Date of Patent: Feb. 22, 2022

(54) HYBRID COVER

(71) Applicant: INTERROLL HOLDING AG, Sant' Antonino (CH)

(72) Inventor: Jürgen Schumacher, Sant'Antonino (CH)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 16/638,366

(22) PCT Filed: Aug. 14, 2018

(86) PCT No.: PCT/EP2018/071969
§ 371 (c)(1),
(2) Date: Aug. 21, 2020

(87) PCT Pub. No.: WO2019/034629
PCT Pub. Date: Feb. 21, 2019

(65) Prior Publication Data
US 2021/0009357 A1    Jan. 14, 2021

(30) Foreign Application Priority Data

Aug. 17, 2017  (DE) .......................... 102017118817.7

(51) Int. Cl.
*B65G 39/09* (2006.01)
*B22D 19/00* (2006.01)
*B65G 23/08* (2006.01)

(52) U.S. Cl.
CPC ............. *B65G 39/09* (2013.01); *B22D 19/00* (2013.01); *B65G 23/08* (2013.01)

(58) Field of Classification Search
CPC ......... B65G 39/09; B65G 23/08; B22D 19/00
See application file for complete search history.

(56) References Cited

U.S. PATENT DOCUMENTS

| 3,931,878 | A | * | 1/1976 | Payne | .................... B65G 39/09 193/37 |
| 4,303,741 | A | | 12/1981 | Klein | |
| 4,315,566 | A | | 2/1982 | Greener | |
| 5,720,319 | A | * | 2/1998 | Smith | .................. F01N 13/082 138/109 |

(Continued)

FOREIGN PATENT DOCUMENTS

| CN | 201914673 | 8/2011 |
| CN | 102438927 | 5/2012 |

(Continued)

*Primary Examiner* — William R Harp
(74) *Attorney, Agent, or Firm* — Price Heneveld LLP (57) ABSTRACT

A motor-driven conveyor roller includes a cylindrical roller body extending along a longitudinal axis of rotation, an axle unit coaxially aligned with the roller body with respect to the longitudinal axis of rotation, a drive unit arranged in the roller body, which is coupled to the roller body and the axle unit to produce a rotational movement between the axle unit and the roller body about the longitudinal axis of rotation, and an end lid which closes the roller body at a first axial end and through which an axle section of the axle unit extends. The end lid has an outer wall formed of stainless steel and an inner wall cast on the outer wall and formed of a light metal.

19 Claims, 4 Drawing Sheets

(56) References Cited

U.S. PATENT DOCUMENTS

| | | | | |
|---|---|---|---|---|
| 6,124,656 | A * | 9/2000 | Jensen | B65G 39/02 |
| | | | | 310/409 |
| 6,443,295 | B1 * | 9/2002 | Hill | B65G 23/08 |
| | | | | 198/788 |
| 6,516,942 | B2 * | 2/2003 | East | B65G 39/09 |
| | | | | 193/35 R |
| 7,837,230 | B2 * | 11/2010 | Meilis | B22D 19/00 |
| | | | | 280/781 |
| 8,790,018 | B2 * | 7/2014 | Leuver | B65G 39/09 |
| | | | | 384/546 |
| 9,056,523 | B2 * | 6/2015 | Norimatsu | B60B 27/0068 |
| 9,586,763 | B2 * | 3/2017 | Reischl | B65G 23/08 |
| 9,731,900 | B2 * | 8/2017 | Ruggeri | B65G 23/08 |
| 10,562,711 | B2 * | 2/2020 | Van Holthe Tot Echten | |
| | | | | B65G 23/08 |
| 2011/0062000 | A1 | 3/2011 | Yamamoto | |
| 2015/0068874 | A1 | 3/2015 | Jepsen et al. | |

FOREIGN PATENT DOCUMENTS

| | | |
|---|---|---|
| CN | 103228460 | 7/2013 |
| CN | 105612113 | 5/2016 |
| CN | 105793173 | 7/2016 |
| CN | 106311796 | 1/2017 |
| DE | 8005696 | 8/1980 |
| DE | 29623889 | 8/2000 |
| DE | 102016112051 | 1/2018 |
| EP | 1656312 | 5/2006 |
| EP | 1671901 | 6/2006 |
| WO | 9737913 | 10/1997 |

* cited by examiner

HYBRID COVER

CROSS-REFERENCE TO FOREIGN PRIORITY APPLICATION

The present application claims the benefit under 35 U.S.C. §§ 119(b), 119(e), 120, and/or 365(c) of PCT/EP2018/071969 filed Aug. 14, 2018, which claims priority to German Application No. 102017118817.7 filed Aug. 17, 2017.

FIELD OF THE INVENTION

The invention relates to a motor-driven conveyor roller comprising a cylindrical roller body extending along a longitudinal axis of rotation, an axle unit coaxially aligned with the roller body with respect to the longitudinal axis of rotation, a drive unit disposed in the roller body and coupled to the roller body and the axle unit to produce a rotational movement between the axle unit and the roller body about the longitudinal axis of rotation, and a first end lid which closes the roller body at a first axial end and through which an axle section of the axle unit extends.

BACKGROUND OF THE INVENTION

Motor-driven conveyor rollers and methods of operating them are basically known from EP 1656312B1 and EP 1671901B1, for example. Such motor-driven conveyor rollers are used in numerous different applications. A typical application is the use in a conveyor line for conveying objects such as containers, consignments of goods, luggage, and the like. In such applications, motor-driven conveyor rollers are mounted horizontally in a frame and the products to be conveyed roll on the outer surface of the roller body. In such applications, motor-driven conveyor rollers are often used together with idle rollers, which do not have their own drive, and which are mounted parallel to the motor-driven conveyor roller in the frame to form a conveyor section. These idle rollers are driven by the motor-driven conveyor roller by means of appropriate drive belts.

A fundamental requirement of motor-driven conveyor rollers, especially in such applications, is the provision of a high torque for conveying and braking even heavy objects without delay. For this reason, motor-driven conveyor rollers with an electronically commutated three-phase a.c. motor have proven their worth. This three-phase motor is arranged inside the roller body to save space and is typically supplied with power via a supply line that passes through a hollow axle element of the motor-driven conveyor roller.

It is required to encapsulate motor-driven conveyor rollers as far as possible in such a way that the ingress of liquids, for example, during cleaning of the conveyor system, is reliably prevented, as is the escape of lubricant from the conveyor roller into the environment. The disadvantage of this type of encapsulation, however, is that, especially at high operating loads, a large amount of heat is generated inside the roller body by the electric motor located inside it and the heat generated cannot be dissipated sufficiently by the encapsulation. The maximum permissible continuous load of such motor-driven conveyor rollers is therefore often limited by a maximum temperature which must not be exceeded for the most temperature-sensitive component within the roller body.

In order to be able to convey products such as containers, packages, pieces of luggage, or pallets with different and/or short lengths evenly in the conveying direction and with support on at least two, preferably three conveyor rollers at any time, conveyor sections on which the products rest directly on the roller bodies are constructed from conveyor rollers with a diameter of about 50 mm. This enables a close alignment of conveyor rollers, only some of which must be designed as motor-driven conveyor rollers, which can then drive other conveyor rollers via a traction drive such as a Poly-V-belt, if necessary. In motor-driven conveyor rollers for this application and with these dimensions, drives are used which have a power output of up to xx watts and are characterized by a compact design with a planetary gear.

Drum motors, which have a diameter of more than 100 mm and are generally used as drive units for belt conveyors, are a different design. Such drum motors use drive units with more than xxx Watt, which often require separate cooling measures such as oil filling of the interior of the drum tube to dissipate the thermal load of the drive via the drum tube. A drum motor is usually wrapped around a conveyor belt, which regularly has a high belt tension in order to be able to transmit the forces from the outer surface of the drum tube in a force-locking manner. In certain applications, conveyor belts with form-locking to the drum tube, for example by means of toothing, are also used to transfer high conveying forces between the drum tube and the conveyor belt.

Such drum motors are subjected to high forces during operation, which are generated by the drive power on the one hand and by the belt tension and the weight of a product resting on the drum motor on the other. Drum motors are often used in demanding environments, such as dust-laden environments. In applications where drum motors are used under clean room conditions or in the pharmaceutical or food processing industry, there is also the added burden of cleaning operations, combined with the requirement that the drum motor must be easy to clean with little risk of bacterial growth in gaps, niches, or the like. Especially due to the deformations occurring under the high load, this requirement, combined with the necessary tightness against entering liquids, for example, when cleaning with a high-pressure cleaning jet, can only be met with very complex measures.

The interface between the front lids and the drum tube on the one hand and the interface between the axle or axle sections in the area of the passage from the drum tube interior to the outside on the other hand has proven to be a particular problem. The inventors have found that known solutions in which the shaft penetrates a plastic or metal lid that rotates with the drum tube and is firmly sealed to the drum tube can only reliably achieve a seal against liquids acting under high pressure if the shaft is solid, which is a major disadvantage for the materials required for use in hygienically demanding environments for cost reasons.

SUMMARY OF THE INVENTION

The invention is based on the object of providing a motor-driven conveyor roller, in particular, a drum motor, in which a reliable and permanent sealing of the interior of the conveyor roller against the environment is ensured in an economically efficient manner even under high mechanical loads.

According to the invention, this task is solved with a motor-driven conveyor roller of the type mentioned above, in which the lid has an outer wall made of stainless steel and an inner wall which is cast to the outer wall and made of a light metal.

According to the invention, a lid is provided for the conveyor roller, which is made of two different materials. The outside of the front lid is made of stainless steel and can preferably be thin-walled, for example formed from a stainless steel sheet and have a wall thickness of less than 1 mm, in particular, less than 0.5 mm. This stainless steel outside is connected to a light metal inside, which is made of a light metal. The light metal inner wall of the lid may be thick-walled and, if necessary, fitted with stiffening ribs or similar and provides the structural load-bearing capacity of the lid. The connection between the stainless steel outer wall and the light metal inner wall of the lid is achieved by pouring the light metal onto the stainless steel and thus provides a material-tight, adhesive connection. In principle, this type of connection can be reinforced by additional frictional or form-locking effects. On the one hand, the composite lid designed according to the invention has a stainless steel outer surface that is advantageous for hygienic requirements, provides high quality properties for hygienic requirements and is easy to clean. This outer side is structurally supported by the cast-on inner side, which is formed from light metal and has a resilient connection to the outer side, provides a high mechanical load capacity of the lid due to the connection, and, due to its precise and efficient machinability, enables the lid to be manufactured with a high fitting accuracy in the area of the axle passage and in the area of the drum tube connection. This combination ensures efficient production with small tolerances and high fitting accuracy without compromising on hygiene requirements.

In accordance with a first preferred design form, it is intended that a material-bound connection created by the casting process is formed between the inner wall and the outer wall. In the case of a joint of this type, the mechanical transmission of force between the outer wall and the inner wall is effected by atomic or molecular forces which are generated during the process of casting the inner wall to the outer wall. This material connection is particularly preferred without the use of an adhesive between the inner wall and the outer wall and makes particular use of the adhesion achieved by the casting process with increased temperature of the light metal.

It is further preferred that the outer wall has an undercut facing the inner wall, which is filled with the light metal of the inner wall to create a form-locking connection between the inner wall and the outer wall. According to this design, the mechanical transmission of force between the inner and outer wall is achieved alternatively or in addition to a material-bound or frictional connection by means of a form-locking connection. For this purpose, an undercut is provided on the outer wall on the side of the inner wall, which is filled by the light metal of the inner wall. The undercut can be made by a correspondingly shaped projection of the outer wall towards the inner wall or by a correspondingly shaped depression in the outer wall on the side facing the inner wall. Preferably, the undercut is filled with the light metal during the casting process of the inner wall. An undercut in this context means a geometric contour which causes a clasp, i.e., a form-locking mechanism which makes it possible to separate the inner wall from the outer wall consequently only by breaking the outer wall material or the inner wall material.

It is particularly preferable if the undercut is formed by a section of the outer wall which is L-shaped in longitudinal section, the first leg of which extends from the outer wall in the axial direction with respect to the longitudinal axis of rotation towards the inner wall and the second leg of which extends radially with respect to the longitudinal axis of rotation. According to this design, the undercut is formed on a profile section with an L-shaped cross section, which is shaped as a projection or as a recess on the outer wall. In this design, the light metal fills the interior space enclosed by the two legs of the L-shaped contour and thus creates the form-locking connection. In principle, it is preferred that the cross-sectionally L-shaped contour extends with one leg in a substantially axial direction and with the second leg in a substantially radial direction, whereby an exact axial or radial alignment is not important for the effect of the invention, but it is essential that the first leg has an alignment with an axial direction component and the second leg has an alignment with a radial direction component. This allows an efficient cast which is free of inclusion with a secure form-locking connection.

It is preferred if the second leg with the radial directional component extends radially outwards from the first leg. This design means that the cavity to be filled by the light metal is formed radially outwards from the first leg. This achieves a particularly reliable and firm form-locking of the inner wall to the outer wall, since in this design the shrinkage occurring when the light metal cools down in the course of the casting process causes the inner wall to be specifically clamped to the outer wall in the area of the undercut, which, especially if the undercut is designed as an annular circumferential undercut, produces a form-locking connection between the inner wall and the outer wall that is reliable with respect to all load directions occurring.

Furthermore, it is preferred that the undercut is formed by a circumferential annular space. By designing the undercut as a circumferential annular space, a form-locking on all sides between the inner wall and the outer wall is achieved, which provides a reliable connection between the inner wall and the outer wall with respect to the loads occurring during operation of the drum motor. Here it is to be understood that the annular space rotates in relation to the longitudinal axis of rotation of the conveyor roller.

It is further preferred that the outer wall is formed from a sheet material by an embossing process. By embossing, the outer wall can be formed from a sheet material, for example, a circularly cut sheet section, and suitable contours such as radially extending reinforcing ribs, circumferential reinforcing ribs, can be formed, which on the one hand improve the mechanical transmission of force between the outer wall and the inner wall through form-fit effects and frictional locking effects achieved as a result of the shrinkage occurring during the casting process, and on the other hand stiffen the outer wall with regard to its contour in such a way that no distortion occurs even during the casting process.

Even further, it is preferred that the inner wall is injection moulded onto the outer wall. An injection moulding process enables the light metal to be cast in a molten state under high pressure and thus enables efficient production of the lid in accordance with the invention in large quantities, with low scrap and good bonding between the inner and outer walls. The injection moulding process is preferably carried out in such a way that the outer wall is prefabricated and inserted into a correspondingly designed injection mould, which is then closed, forming a cavity that forms the space for the inner wall, in order to then inject the light metal under excess pressure in a molten state in this cavity and consequently on the outer wall.

It is further preferred that the inner wall has a projection facing the drive unit and the drive unit is positively supported on the projection against rotation of the drive unit about the longitudinal axis of rotation relative to the lid. Such a projection or plurality of projections serves, in particular, to fix the drive unit torque-resistant to the lid and thus to the roller body in order to enable a transmission of driving forces from the drive unit to the roller body. In principle, a torque-proof connection of the lid with the roller body is preferred in order to achieve a reliable seal between lid and roller body via this large diameter interface, whereas a rotatable and likewise sealed bearing can be provided in the area between lid and axle or stub shaft. In this case, the drive unit generates a torque between the roller body and stub shaft, which can be transmitted to the roller body via one or a corresponding number of projections on lids. It is particularly preferred here that the projection(s) are made of light metal and can therefore be efficiently machined to achieve a good fit for the power transmission from the drive unit to the lid. In this respect, it is particularly preferable if the projection or if the majority of the projections have projection surfaces produced by mechanical, in particular machining.

Even further, it is preferable for the lid to have an inner peripheral surface and an outer peripheral surface that are coaxial in relation to the longitudinal axis of rotation. Such an inner peripheral surface and outer peripheral surface, which are understood to have exactly radially outwardly and radially inwardly oriented surface normals, but also a surface normal which has an axially outwardly and axially inwardly oriented directional component and thus has an oblique radial-axial orientation, can be advantageously used to fix the lid to the roller body and to pass through a central opening in the lid a stub shaft and to arrange a bearing for this stub shaft in relation to the lid. In particular, the inner circumferential surface may be designed to receive rolling bearings for mounting the stub shaft on the lid and, if necessary, to additionally receive one or more sealing elements, for example, a radial shaft seal and a sealing ring of L-shaped cross-section, which may be additionally provided axially outwards from this radial shaft seal, on the lid.

It is particularly preferred if the inner circumferential surface is designed as a bearing seat and manufactured by machining and/or that the outer circumferential surface is designed as a sealing surface and manufactured by machining. The machining design of the inner peripheral surface and/or the outer peripheral surface of the lid according to the invention can be carried out in a particularly efficient manner, since light metal is machined. Compared to the machining of stainless steel, steel, or plastic, which is often necessary in prior art techniques, this machining has the advantage that an effective and fast machining of the light metal is possible, but at the same time a resilient surface with high geometric precision and tolerance can be produced.

A further aspect of the invention is a lid for the axial end closure of a roller body of a motor-driven conveyor roller, in particular, a drum motor, in which the lid has an outer wall formed from stainless steel and an inner wall which is cast to the outer wall and formed from a light metal. The lid according to this aspect of the invention has all the features of the lid of the motorised conveyor roller as explained above and it is understood that the lid can be further developed, in particular, with the features of the lid of the motorised conveyor roller as explained above and thereby obtain the advantages described in connection with these features.

Finally, a further aspect of the invention is a method for manufacturing a lid of a motor-driven conveyor roller, in particular, a drum motor, with the steps: (a) forming an outer wall of the lid from a stainless steel, (b) forming an inner wall of the lid from a light metal on the outer wall, and (c) connecting the outer wall to the inner wall in step (b). This process can be used, in particular, to produce a lid for a motorised conveyor roller of the type described above or a lid of the type described above. It is to be understood that the manufacturing method may, in particular, be designed in such a way that it has the characteristics described above for the lid of the conveyor roller of the invention.

In particular, the method can be further developed by forming the inner wall of the lid from a free-flowing light metal by means of an injection process. Such a forming process can be carried out, for example, by embossing or deep drawing and achieves the advantages described above with regard to the embossing process of the outer wall of the lid of the conveyor roller according to the invention and enables the variants described there.

Even further, it is preferred that the inner wall of the lid is moulded from a free-flowing light metal by an injection process. In particular, the injection process can be carried out by injecting a molten material in a mould with overpressure of the molten light metal, and in doing so achieves the advantages described in relation to the injection of the light metal for the lid of the invention-conveying roller described above and can realise the associated variants.

It is even more preferred if the inner wall of the lid is connected to the outer wall of the lid in step (b) by means of a form-locking connection and/or by means of a material connection. In particular, the material-to-material bond between the material of the inner wall and the material of the outer wall can be achieved without the use of an adhesive, i.e., in particular, by the atomic and molecular forces generated as a result of the molten casting of the light metal. The form-locking connection can be formed in particular by casting around an undercut in a recess or on a projection of the outer wall. In particular, the positive-locking connection can be designed in such a way that the locking of the positively interacting sections of the inner wall and outer wall is prevented by the shrinkage process of the light metal during the casting process or injection process of the light metal onto the outer wall is reinforced, for example by producing the form-locking by means of a recess filled with light metal, which points radially outwards and which is formed at undercuts arranged opposite one another at least with respect to an axis of rotational symmetry of the lid, preferably by an undercut running annularly around such an axis of rotational symmetry of the lid, which is or points radially outwards.

Finally, it is even more preferred if a bearing seat and/or a seal seat is formed on the inner wall and/or the outer wall of the lid after step (c) in a machining process. Machining can preferably be carried out on the light metal, and, in particular, only on the light metal, which enables particularly efficient and precise production of the bearing seats with high tolerance quality.

BRIEF DESCRIPTION OF THE DRAWINGS

Preferred embodiments of the invention are described using the enclosed Figures.

DETAILED DESCRIPTION OF THE EMBODIMENTS

Figure 1:
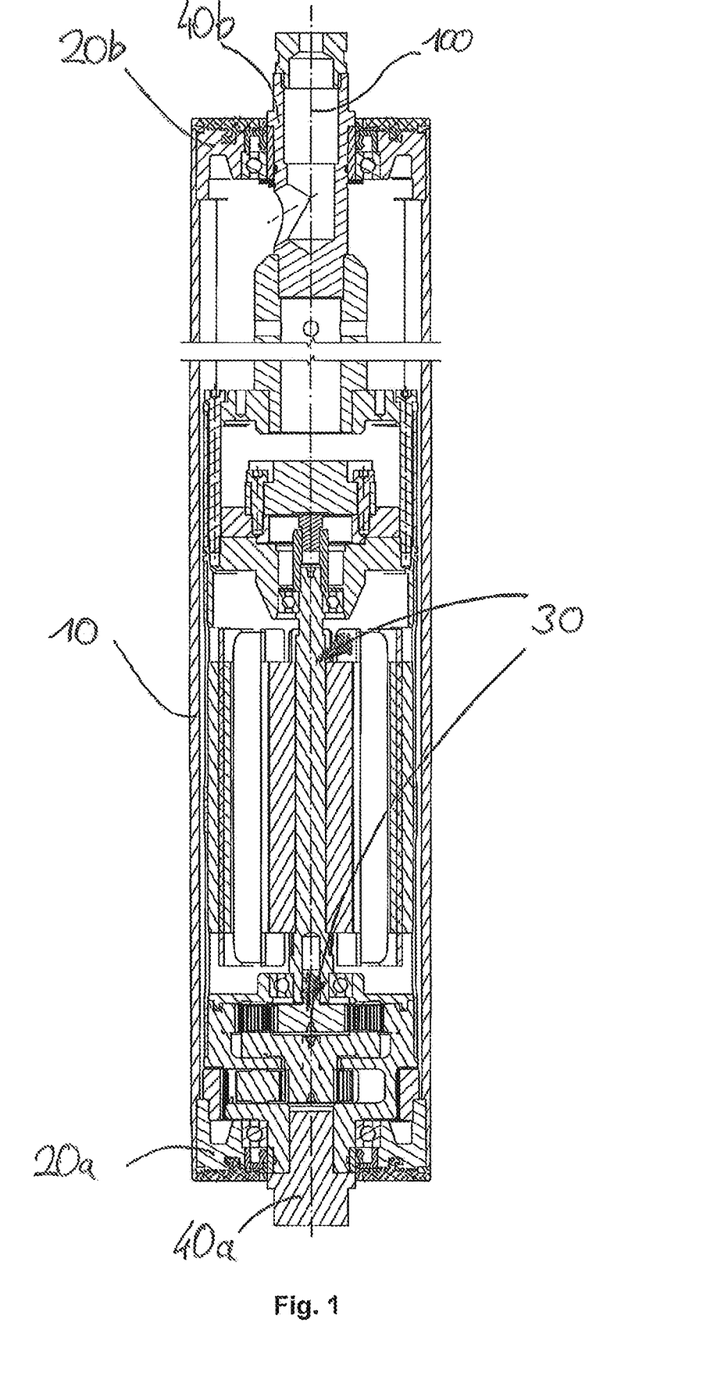
FIG. 1 is a cross-sectional view of preferred design of a motor-driven conveyor roller according to the invention.

Referring first to FIG. 1, a drum motor is basically made up of a drum tube 10, into which a lid 20*a*, 20*b* is inserted at each end, preferably of the same design. The lids 20a, 20b, are torque-proof connected to the drum tube 10 by creating a frictional interference fit between the outer circumference of the lids 20a, 20b and the circumference of the drum tube 10. Instead of the frictional connection, torque transmission can also be realized by form-locking, material flow or mixed forms of this.

Inside the drum tube 10 there is a drive unit 30 consisting of an electric motor and a gearbox. The drive unit 30 generates a torque and a rotational movement between the drum tube 10 and two stub axles 40a, 40b, which are supported by roller bearings in the lids 20a, 20b. The stub axles 40a, 40b, protrude at the front side out of the respective lid 20a, 20b and can therefore be fixed in a frame which accommodates the drum motor. The drive unit 30 is supported torque-proof on the stub axles 40a, 40b and transmits the torque serving for rotation via the left-hand lid 20a to the drum tube 10.

In use, the drum motor 10 shown in FIG. 1 is typically used with a horizontal longitudinal axis of rotation 100 and may contain an oil filling in the interior for thermal dissipation of heat from the drive unit 30 to the environment via the drum tube 10.

Figure 2:
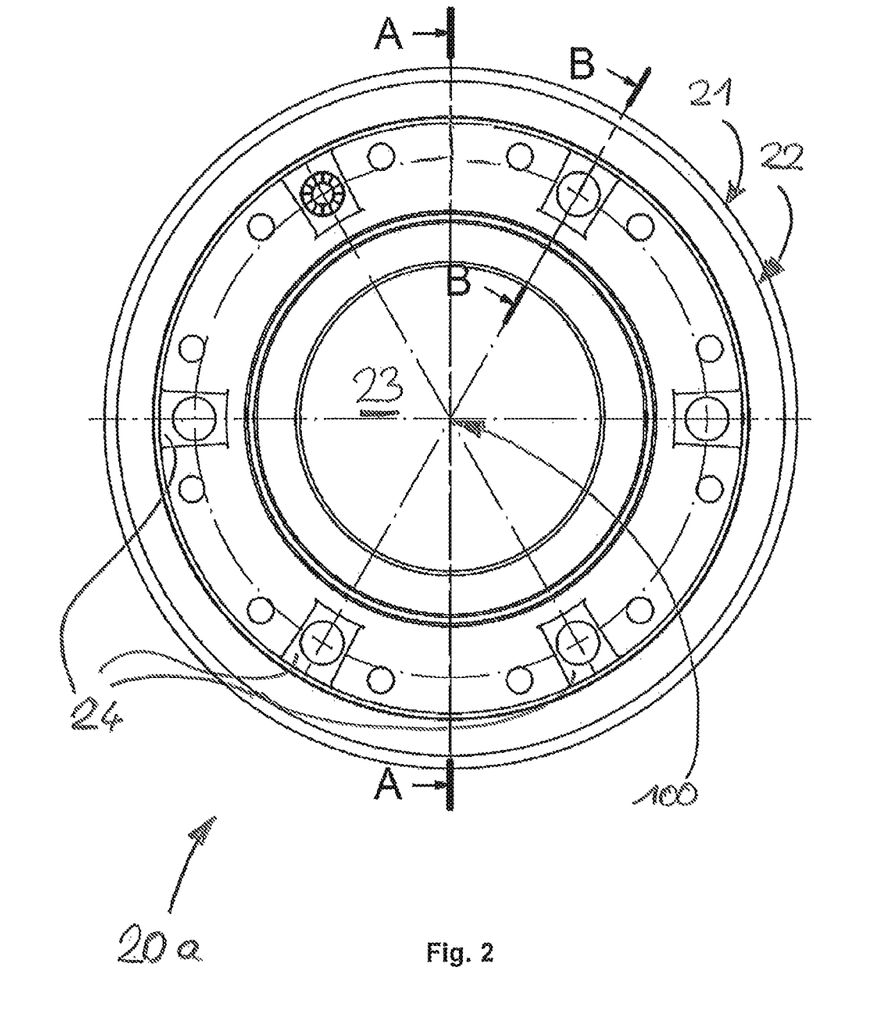
FIG. 2 is a frontal view of the inside of a lid of the conveyor roller according to the invention.

FIG. 2 shows an inside view of the lid 20a and 20b. As can be seen, the lid 20a, 20b has a first circumferential surface 21 and a second circumferential surface 22, slightly reduced in diameter. The first circumferential surface 21 has a diameter which corresponds to the diameter of the drum tube 10 and thus covers the front of the drum tube 10, while the second circumferential surface 22 is used to fix the lid in the drum tube 10 and is dimensioned in such a way that it forms a frictional press connection to the inner circumference of the drum tube 10.

A central opening 23, which is arranged coaxially around the longitudinal axis of rotation 100, is used to feed the axle stub 40a or 40b. The lid 20a, 20b also has a total of six projections 24 which protrude axially towards the inside and serve for positive torque connection with the output shaft of the gearbox of the drive unit 30.

Figure 3:
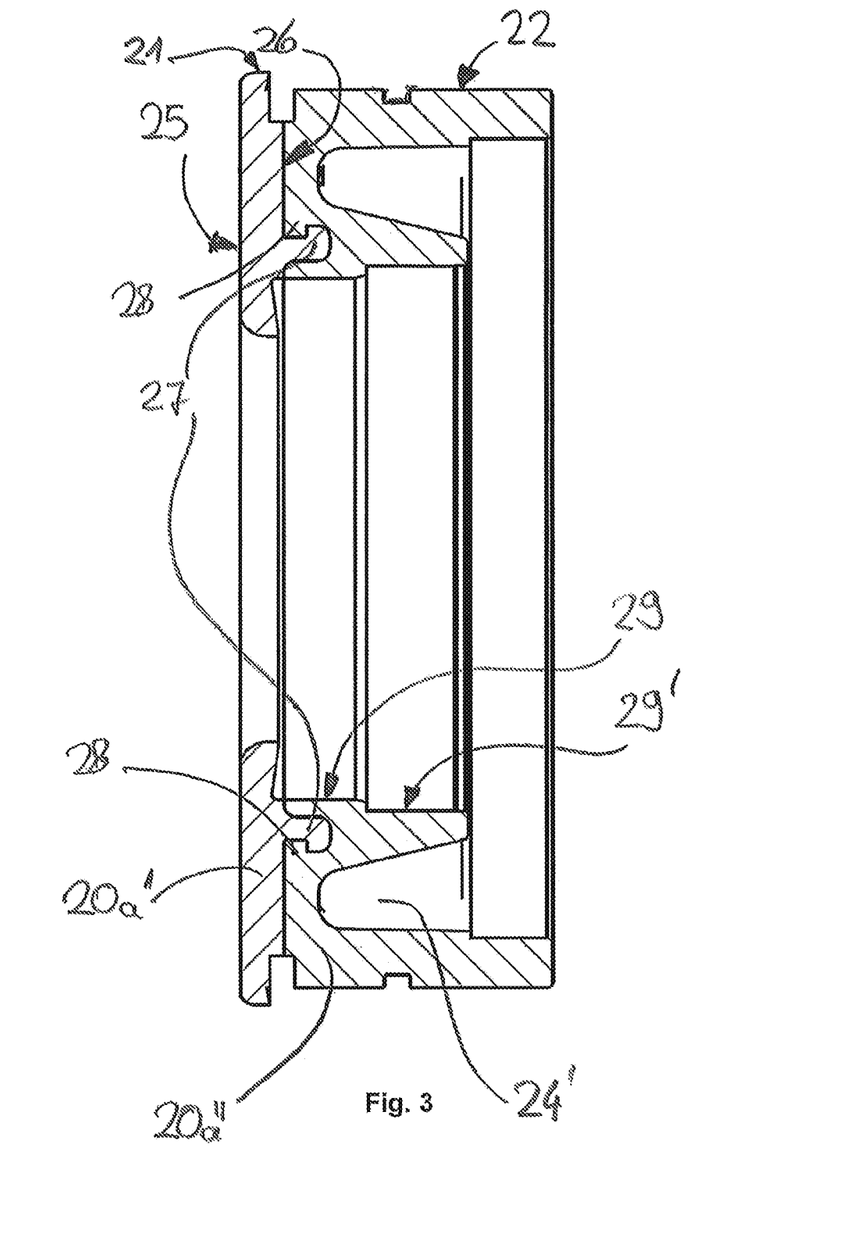
FIG. 3 is a cross-sectional view of the lid cut along line A-A in FIG. 2 as shown in FIG. 2.

As shown in the longitudinal sections in FIGS. 2 and 3, the lid 20a is made up of an outer wall 20a' and an inner wall 20a". The outer wall 20a' is made of stainless steel, i.e., a rustproof material that is insensitive to the effects of many chemical substances. The outer wall 20a' may be produced by stamping or casting, deep drawing, or by machining.

The inner wall 20a" is made of a light metal, especially aluminium. The inner wall 20a" is connected to the outer wall 20a' by casting and is shaped in its basic geometric structure. Both the outer wall 20a' and the inner wall 20" can still be machined on different surfaces by mechanical finishing after the connection of the inner wall and the outer wall to produce certain dimensions and geometric structures.

The outer wall 20a' is essentially ring-shaped and covers the entire section of the lid 20a, 20b. The inner wall 20a" therefore does not come into contact with any liquids or solids acting on the drum motor 10 from outside. The outer wall 20a' has a flat end face 25.

On the side of the outer wall 20a' opposite the end face 25 and facing the inner wall 20a', the outer wall 20a' is also formed with a flat contact surface 26. From this flat contact surface 26 an annular protrusion 27 protrudes, which is circumferential around the rotation axis 100 and extends in axial direction to the inner wall 20a". This annular protrusion 27 is L-shaped in cross section, with the first leg extending axially from the inward-facing face 26 of the outer wall to the inner wall 20a" and the second leg extending radially outwards from the end of the first leg. The protrusion 27 thus forms an undercut which is filled by the material of the inner wall 20a" in area 28. This undercut with filling through the material of the inner wall 20a" provides a form-locking between the inner wall 20a" and the outer wall 20a'. Due to the fact that the inner wall 20a" is cast onto the outer wall 20a' and the shrinkage that occurs in this process, this form-locking is slightly braced and thus particularly secure, since the filled undercut points radially outwards, causing the material of the inner wall 20a" to be tensioned in the circumferential direction due to the shrinkage, which results in a braced locking of the inner wall 20a" at the protrusion 27 of the outer wall 20a'.

The inner wall 20a", made of light metal, has the outer peripheral surface 22, which is machined by machining the light metal to the desired dimension with a tolerance in order to achieve the interference fit with the inner peripheral surface of the drum tube 10. In addition, a groove is provided in the outer circumferential surface 22 in the circumferential direction which can be used to accommodate a sealing ring in order to achieve a reliable seal between the lid 20a and the drum tube 10.

The circumferential surface 22 of the lid 20a, 20b, which is in the diameter of the outer circumferential surface 22 of the drum tube 10, is separated from the circumferential surface 22 by a circumferential annular groove, which has the function that in the area of recess 23, machined inner peripheral surfaces 29, 29' are also present on the inner wall, which serve to accommodate a radial shaft seal in the area of peripheral surface 29 and a rolling bearing in the area of peripheral surface 29'. By machining, an exact fit of the radial shaft seal and the rolling bearing in the lid can be achieved here in an efficient production method.

Figure 4:
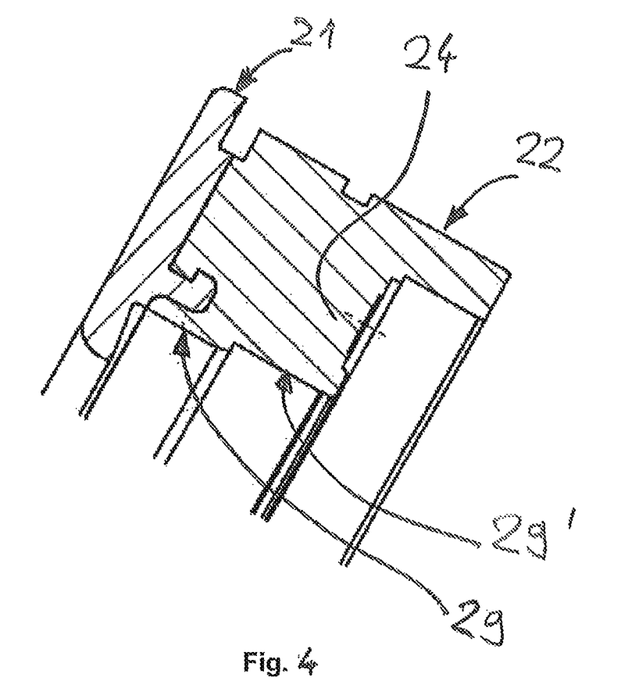
FIG. 4 is a partial cross-sectional view of the lid cut along line B-B in FIG. 2, as shown in FIG. 2.

FIG. 4 shows a longitudinal section through the lid 20a, 20b in the area of projection 24. Axially inside, rotationally symmetrical centring holes are formed on the projection 24 as a recess and serve for exact positioning and locking of the gearbox output shaft. FIG. 3 shows a longitudinal section between these protrusions, from which the recess 24' between the respective projection 24 can be seen.

In the manufacturing process of the lid shown in the figures, the outer wall 20a' is first produced by machining from solid material, by casting or by an embossing process from a plate material, and in the process the protrusion 27 is also formed. The outer wall 20a" is then placed in an injection mould and fixed in it. This injection mould simultaneously forms a cavity which corresponds to the contour of the inner wall 20a" and the light metal which forms the inner wall is injected into this cavity in a molten state under an overpressure. During this injection process, a material-tight connection between the inner wall and the outer wall takes place. Once the light metal has solidified, the lid can be removed from the injection mould and the said faces 22, 29, 29', the centring holes in the projections 24, and the annular groove for the sealing ring in the peripheral face 22 can be produced by machining.

The invention claimed is:

1. A motor-driven conveyor roller comprising:
   a cylindrical roller body extending along a longitudinal axis of rotation;
   an axle unit coaxially aligned with the roller body in relation to the longitudinal axis of rotation;
   a drive unit arranged in the roller body, which is coupled with the roller body and the axle unit to generate a rotational movement between the axle unit and the roller body about the longitudinal axis of rotation; and
   an end lid which closes the roller body at a first axial end and through which an axle section of the axle unit extends, wherein the end lid comprises an outer wall formed of stainless steel and an inner wall which is cast to the outer wall and formed of a light metal.

2. The conveyor roller according to claim 1, wherein a materially bonded connection is formed between the inner wall and the outer wall.

3. The conveyor roller according to claim 1, wherein the outer wall is formed from a sheet material by an embossing process.

4. The conveyor roller according to claim 1, wherein the inner wall is injection moulded onto the outer wall by an injection moulding process.

5. The conveyor roller according to claim 1, wherein the end lid has an inner peripheral surface and an outer peripheral surface which are coaxial with respect to the longitudinal axis of rotation.

6. The conveyor roller according to claim 5, wherein the inner peripheral surface is formed as a bearing seat and is produced by machining.

7. The conveyor roller according to claim 5, wherein the outer peripheral surface is formed as a sealing surface and is produced by machining.

8. A motor-driven conveyor roller comprising:
a cylindrical roller body extending along a longitudinal axis of rotation;
an axle unit coaxially aligned with the roller body in relation to the longitudinal axis of rotation;
a drive unit arranged in the roller body, which is coupled with the roller body and the axle unit to generate a rotational movement between the axle unit and the roller body about the longitudinal axis of rotation; and
an end lid which closes the roller body at a first axial end and through which an axle section of the axle unit extends, wherein the end lid comprises an outer wall formed of stainless steel and an inner wall which is cast to the outer wall and formed of a light metal;
wherein the outer wall has an undercut directed toward and proximate the inner wall, wherein the undercut is filled by the light metal of the inner wall to produce a form-locking connection between the inner wall and the outer wall.

9. The conveyor roller according to claim 8, wherein the undercut is formed by a section of the outer wall which is L-shaped in a longitudinal section, a first limb of which extends from the outer wall in the axial direction with respect to the longitudinal axis of rotation in the direction of the inner lid and a second limb disposed on a distal end of the first limb and which extends radially with respect to the longitudinal axis of rotation.

10. The conveyor roller according to claim 8, wherein the undercut defines a circumferential annular space.

11. A motor-driven conveyor roller comprising:
a cylindrical roller body extending along a longitudinal axis of rotation;
an axle unit coaxially aligned with the roller body in relation to the longitudinal axis of rotation;
a drive unit arranged in the roller body, which is coupled with the roller body and the axle unit to generate a rotational movement between the axle unit and the roller body about the longitudinal axis of rotation; and
an end lid which closes the roller body at a first axial end and through which an axle section of the axle unit extends, wherein the end lid comprises an outer wall formed of stainless steel and an inner wall which is cast to the outer wall and formed of a light metal;
wherein the inner wall has a projection directed toward the drive unit and the drive unit is supported in a form-locking manner at the projection against rotation of the drive unit about the longitudinal axis of rotation relative to the end lid.

12. A lid for axially closing an end of a roller body of a motor-driven conveyor roller, wherein the lid comprises an outer wall formed of stainless steel and an inner wall which is cast to the outer wall and formed of a light metal;
wherein the inner wall is injection moulded onto the outer wall by an injection moulding process and the outer wall has an undercut directed toward and proximate the inner wall, wherein the undercut is filled by the light metal of the inner wall during the injection moulding process to produce a form-locking connection between the inner wall and the outer wall.

13. A method for manufacturing an end lid of a motor-driven conveyor roller comprising the steps of:
forming an outer wall of the end lid from stainless steel;
moulding an inner wall of the end lid from a light metal to the outer wall; and
connecting the outer wall to the inner wall by moulding the inner wall of the end lid from a light metal to the outer wall of the end lid;
wherein the inner wall is cast to the outer wall.

14. The method according to claim 13, wherein the outer wall of the end lid is formed from a sheet material by a forming process.

15. The method according to claim 13, wherein the inner wall of the end lid is moulded from a flowable light metal by an injection moulding process.

16. The method according to claim 13, wherein the inner wall of the end lid is connected to the outer wall of the end lid by a form-locking connection.

17. The method according to claim 13, wherein the inner wall of the end lid is connected to the outer wall of the end lid by a material-bound connection.

18. The method according to claim 13, followed by the step of forming a bearing seat on the inner wall of the end lid in a machining process.

19. The method according to claim 13, followed by the step of forming a seal seat on the inner wall of the end lid in a machining process.

* * * * *